United States Patent [19]

Naitoh

[11] 4,349,164

[45] Sep. 14, 1982

[54] RETRACTOR PROVIDED WITH TWO TYPES OF EMERGENCY LOCKING MECHANISM AND TAKE-UP FORCE LOCKING MEANS

[75] Inventor: Katsumi Naitoh, Fujisawa, Japan

[73] Assignee: NSK-Warner K. K., Tokyo, Japan

[21] Appl. No.: 190,495

[22] Filed: Sep. 25, 1980

[30] Foreign Application Priority Data

Oct. 2, 1979 [JP] Japan .................................. 54-135843

[51] Int. Cl.³ ........................ A62B 35/02; B65H 75/48
[52] U.S. Cl. ....................... 242/107.4 A; 242/107.4 B;
242/107.6; 297/478
[58] Field of Search ................... 242/107.4 R–107.4E,
242/107, 107.6, 107.7, 107.12; 280/806–808;
297/478, 480

[56] References Cited

U.S. PATENT DOCUMENTS

| | | | |
|---|---|---|---|
| 3,450,368 | 6/1969 | Glauser et al. | 242/107.4 B |
| 4,061,291 | 12/1977 | Cunningham | 242/107 |
| 4,063,777 | 3/1979 | Takada | 242/107.7 X |
| 4,083,511 | 4/1978 | Ikesue | 242/107.4 A |
| 4,084,765 | 4/1978 | Bonnaud | 242/107 X |
| 4,172,568 | 10/1979 | Yamanashi et al. | 242/107.6 |
| 4,261,531 | 4/1981 | Naitoh | 242/107.6 |

Primary Examiner—John M. Jillions
Attorney, Agent, or Firm—Shapiro and Shapiro

[57] ABSTRACT

A retractor comprises reel shaft means rotatably supported between the two opposed side plate portions of a base member, a gear fixed to one end of the reel shaft means and meshing with another gear given a take-up force by a take-up spring and rotatably supported on that side plate portion which is adjacent to the one end of the reel shaft means, take-up force locking means for diminishing or nulling the take-up force of the take-up spring applied to webbing during the wearing of a belt, the take-up force locking means being mounted on that side plate portion which is adjacent to the one end of the reel shaft means, a webbing-sensitive emergency locking mechanism mounted on that side plate portion which is adjacent to the other end of the reel shaft means, and a vehicle-sensitive emergency locking mechanism mounted on the inner surface of that side plate portion which is adjacent to the other end of the reel shaft means.

3 Claims, 9 Drawing Figures

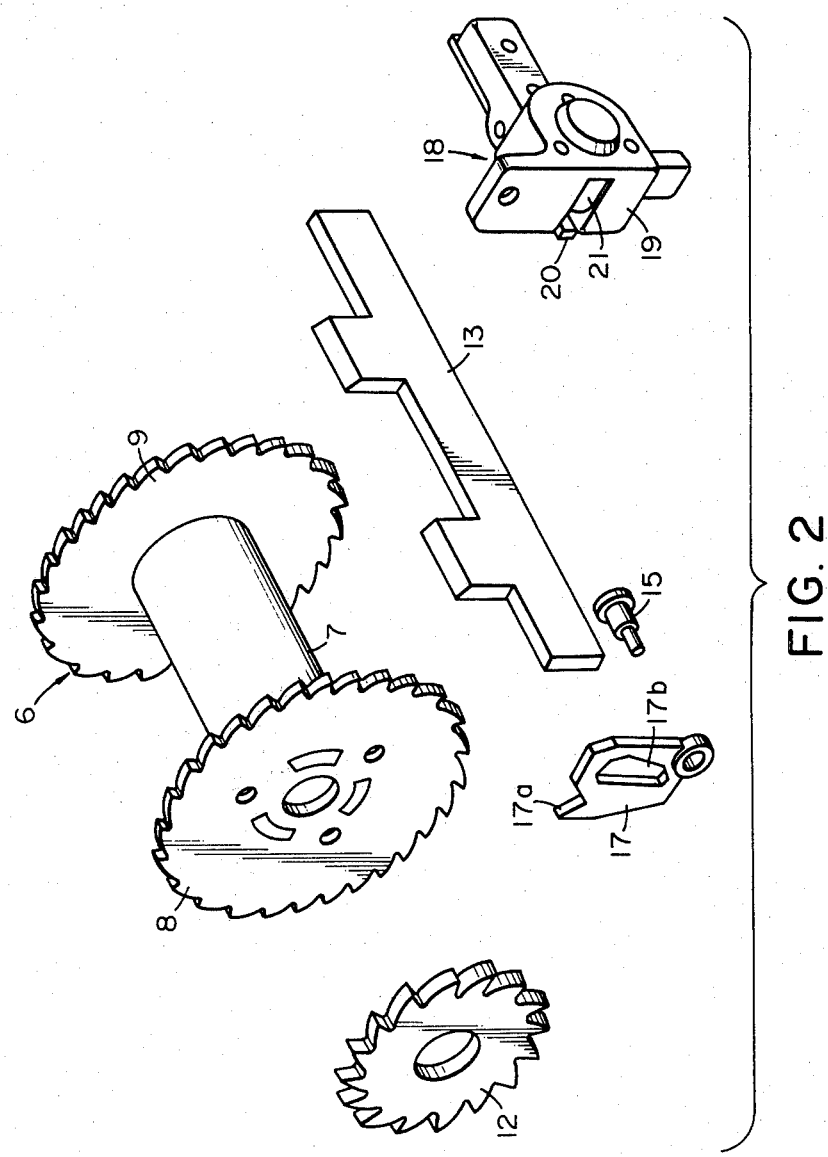

RETRACTOR PROVIDED WITH TWO TYPES OF EMERGENCY LOCKING MECHANISM AND TAKE-UP FORCE LOCKING MEANS

BACKGROUND OF THE INVENTION

1. Field of the Invention

This invention relates to a dual type tension lock seat belt retractor provided with a so-called vehicle-sensitive emergency locking mechanism and a so-called webbing-sensitive emergency locking mechanism and having take-up force locking means for diminishing or nulling a take-up force, i.e. tension, applied to webbing while the belt is being worn.

The vehicle-sensitive emergency locking mechanism is a mechanism in which, when a deceleration over a predetermined value has occurred to a vehicle, sensing means is displaced and this displacement brings a lock member to a lock position to prevent rotation of webbing take-up reel shaft means in webbing draw-out direction, and the webbing-sensitive emergency locking mechanism is a mechanism in which, when by draw-out of the webbing, reel shaft means receives an angular acceleration over a predetermined value or reaches an angular speed over a predetermined value, sensing means senses this and brings a lock member to a lock position to prevent rotation of the reel shaft means in webbing draw-out direction.

2. Description of the Prior Art

Heretofore, various dual type retractors have been proposed to ensure safer wearing of the belt while, on the other hand, various tension lock retractors have been proposed to meet the requirement for comfortable wearing of the belt. Most of the conventional tension lock retractors are combined with a vehicle-sensitive emergency locking mechanism, and a dual type tension lock retractor does not yet exist because of the technical difficulty involved in realizing it.

SUMMARY OF THE INVENTION

It is therefore an object of the present invention to provide a dual type tension lock retractor having both the characteristic of a dual type retractor and the characteristic of a tension lock retractor.

To achieve such object, according to the present invention, a webbing-sensitive emergency locking mechanism is provided on one of a pair of reel shaft means supporting side plate portions of the retractor and take-up force locking means is provided on the other of the pair of reel shaft means supporting side plate portions and therefore, a webbing takeup spring is not mounted directly to the reel shaft means but is mounted to a box provided with a gear portion meshing with a gear of the locking means fixed to the shaft so as to leave one of the side plate portions available for the webbing sensitive emergency locking mechanism.

The invention will become more fully apparent from the following detailed description thereof taken in conjunction with the accompanying drawings.

BRIEF DESCRIPTION OF THE DRAWINGS

FIG. 2 is an exploded view of a vehicle-sensitive emergency locking mechanism.

DESCRIPTION OF THE PREFERRED EMBODIMENTS

An embodiment of the present invention will hereinafter be described with reference to the drawings.

Figure 1:
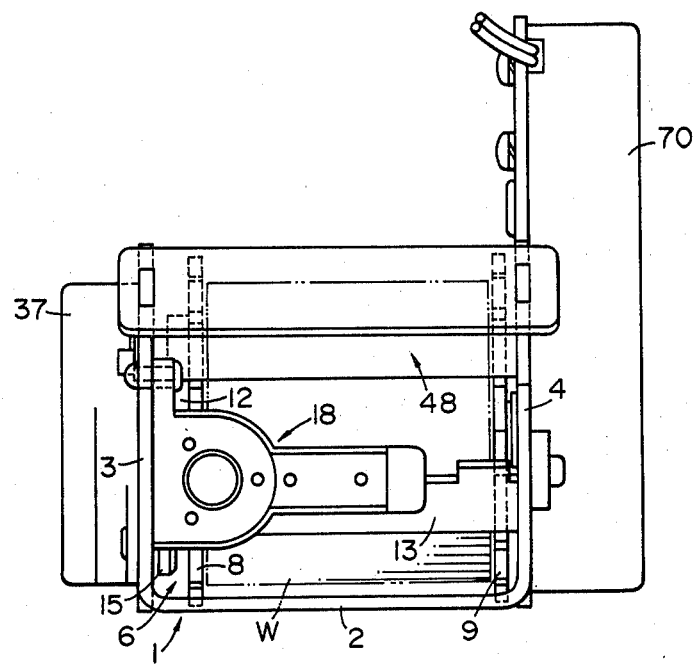
FIG. 1 is a bottom plan view of an embodiment of the present invention.

In FIG. 1, reel shaft means 6 on which webbing W is to be taken up is pivotably supported between opposite side plate portions 3, 4 of a base member 1 comprising a base portion 2 and the two side plate portions 3, 4. A deceleration sensing device 18 of a vehicle-sensitive emergency locking mechanism is mounted on the inner side surface of the side plate portions 3, a webbing-sensitive emergency locking mechanism covered with a cover 37 is mounted on the outer side of the side plate portion 3, and a take-up force locking mechanism covered with a cover 70 and a reel shaft means biasing take-up spring 5 (FIG. 5) are mounted on the outer side of the side plate portion 4.

Individual mechanisms will be described. Description will first be made of the vehicle-sensitive emergency locking mechanism shown in FIG. 2. The reel shaft means 6 comprises latch plates 8, 9 secured to a shaft 10 (FIGS. 3 and 4), a sleeve 7 secured between the two latch plates, and a ratchet gear 12 secured to the outer side surface of the latch plate 8 concentrically therewith.

On the other hand, a case 19 of the sensing device 18 is secured to the inner side surface of the side plate portion 3, and within the chamber of this case 19, a speed change sensing member 21 is contained so that it tilts when a deceleration over a predetermined value occurs to the vehicle. On the top portion of the case 19, a lever 20 is tiltably mounted and is rotatable clockwisely as viewed in FIG. 2 when the sensing member 21 tilts, thereby acting to raise a ratchet lever 17 mounted to the side plate portion 3 above the sensing device 18 by means of a pin 15.

The ratchet lever 17 has a ratchet tooth 17a and, when it is raised by the lever 20 as described above, the ratchet tooth 17a meshes with the ratchet gear 12 and the ratchet lever 17 is further raised by the rotational force of the ratchet gear 12, in clockwise direction as viewed in FIG. 2, namely, in the webbing draw-out direction. By this, a lock member 13 having one end loosely inserted in a hole 17b of the ratchet lever 17 is rotated counter-clockwisely as viewed in FIG. 2 and meshes with the latch plates 8 and 9 of the reel shaft means 6 to thereby lock the rotation of this shaft means 6 in the webbing draw-out direction.

Figure 3:
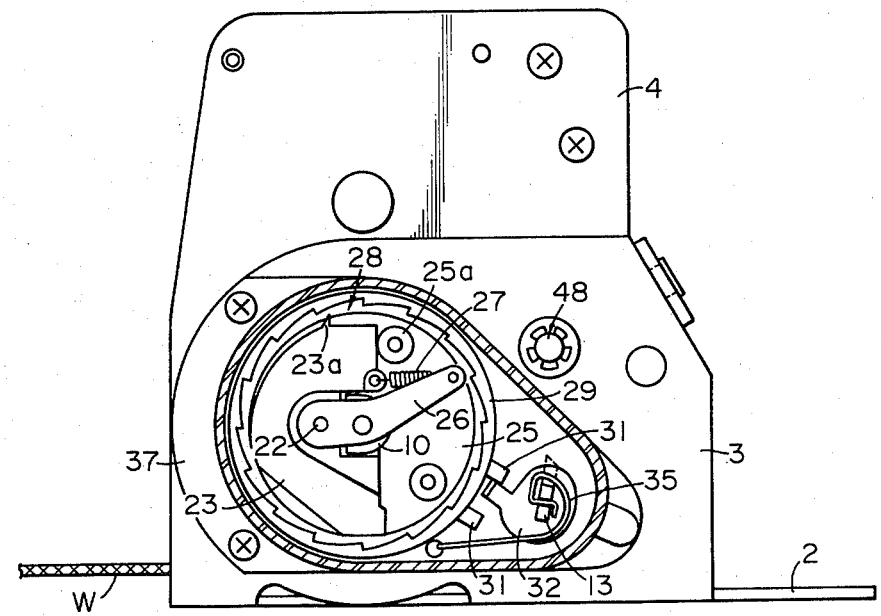
FIG. 3 is a front view of a webbing-sensitive emergency locking mechanism.

Description will now be made of the webbing-sensitive emergency locking mechanism shown in FIG. 3.

A disc 25 is provided integrally at the end of the shaft 10 which extends outwardly of the side plate portion 3, and a substantially semicircular inertia member 23 with a tooth 23a is rotatably disposed at the position of the center of gravity thereof on a boss 22 studded at an eccentric position on the disc 25. A stopper 25a is provided at a position on the disc 25 which is adjacent to the inertia member 23.

A holding plate 26 is further secured to the end portion of the shaft 10 and this holding plate is also connected to the boss 22 to strengthen the integral relation between the holding plate 26 and the shaft 10 and hold the inertia member 23 so that the latter does not get out of place. A coil spring 27 is provided between the end of the holding plate 26 and the inertia member 23, whereby the inertia member is normally engaged with the stopper 25a.

A circular cup member 28 is pivotably disposed on the shaft 10 and inside of the disc 25 and has on its outer peripheral portion an axially outwardly extending cylinder portion 29 provided with ratchet teeth. A bifurcated lug 31 for transmitting the rotational movement is projected outside of the cylinder portion 29, and a bent end portion of a lever 32 biased clockwise as viewed in FIG. 3 by a return spring 35 extends into the bifurcation of the lug 31. The lever 32 is formed with a slot in which one end of the lock member 13 is received. Thus, the rotation of the cup member 28 is transmitted to the lock member 13.

The above-described webbing-sensitive emergency locking mechanism is protected by the cover 37.

Reference is now had to FIGS. 4 to 9 to describe the take-up force locking means and the webbing take-up spring 5.

At the end of the shaft 10 of the reel shaft means 6 which is adjacent to the side plate portion 4, a main gear 40 integral with the shaft 10 is rotatably mounted. There is a conical spring 57 (see FIG. 6) between the main gear 40 and the shoulder 10a of the shaft 10 and this conical spring urges a disc 50 having a horn portion 50a adjacent the back side of the main gear 4 with a suitable force.

Figure 4:
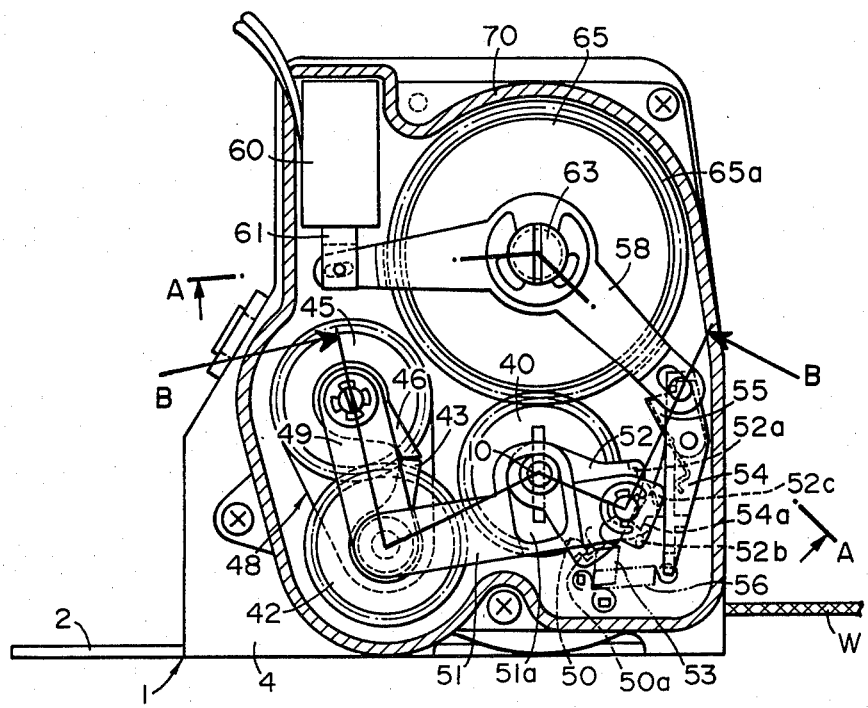
FIG. 4 is a front view of take-up force locking means and a box for a webbing take-up spring.
Figure 6:
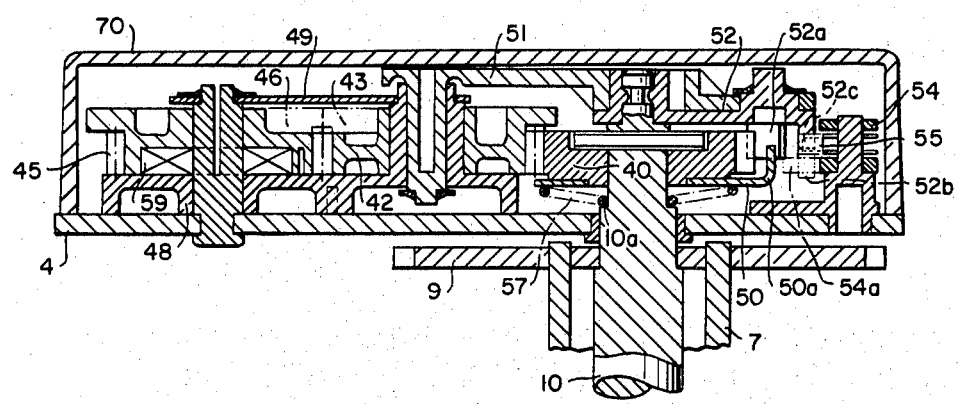
FIG. 6 is a cross-sectional view taken along line B—B of FIG. 4.

On the other hand, an idle gear 42 and a stop gear 45 meshing with each other are rotatably supported between a shifter 48 supported by a shaft portion thereof fixed to side plate portion 4 and pivotable about this shaft portion, and a clamp plate 49. The idle gear 42 is provided with a first cam 43 integral therewith and extending radially thereof, and the stop gear 45 is provided with a second cam 46 integral therewith and extending radially thereof. These cams 43 and 46 bear against each other as shown in FIG. 4 to bring the gears 42 and 45 to a first mutual rotation preventing position because, when the idle gear 42 and the main gear 40 is not in mesh, the stop gear 45 is biased clockwise by a return spring 59 (FIG. 6). In this position, the two gears 42 and 45 cannot rotate counter-clockwise and clockwise, respectively. Another mutual rotation preventing position is realized when the gears 42 and 45 rotate counter-clockwise and clockwise, respectively, from the position of FIG. 4 and the two cams 43 and 46 cause a phase deviation during each rotation thereof due to a difference in number of teeth between the gears 42 and 45, whereby the two cams come to a position substantially symmetrical to the first mutual rotation preventing position of FIG. 4 with respect to the line passing through the centers of the two gears 42 and 45.

A lever 51 which, with a link arm 52, forms a toggle link mechanism has one end pivotally supported at the position of the center of rotation of the idle gear 42, has in the intermediate portion thereof a lever rotation range limiting slot 51a receiving therein the outer end of the shaft 10, and has the other end linked to the link arm 52. On the inner surface of the link arm 52, there is formed a sector-shaped recess 52a opening by a predetermined center angle into which the horn portion 50a of the disc 50 enters, and in the radially outer side thereof, there are provided two inwardly projecting projections 52b and 52c (indicated by broken lines) for respectively engaging a pawl portion 54a of a trigger member 54 and a lever hook spring 55 contained within the trigger member 54. This toggle link mechanism is biased clockwise by a return spring 53, as viewed in FIG. 4.

Figure 5:
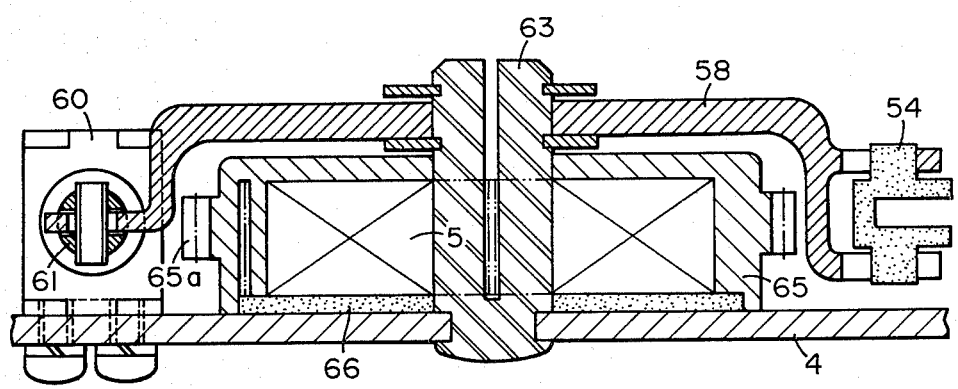
FIG. 5 is a cross-sectional view taken along line A—A of FIG. 4.

The upper end of the trigger member 54, as viewed in FIG. 4, biased clockwise by a return spring 56 and pivotably provided is loosely linked to an arm 58 pivotally mounted on the upper portion of a shaft 63 secured to the side plate portion 4, as shown in FIG. 5. The other end of the arm 58 is linked to a plunger 61 of a solenoid assembly 60. Accordingly, when the tongue and buckle of a seat belt are brought into engagement and the solenoid 60 is energized to attract the plunger 61, the arm 58 rotates clockwise as viewed in FIG. 4 and the trigger member 54 rotates counter-clockwise against the force of the return spring 56.

The inner end of the take-up spring 5 is secured to the shaft 63 and the outer end of the take-up spring is secured to the inner wall of a cup member 65 having a gear portion 65a meshing with the main gear 40. By this, the reel shaft means 6 is biased in the webbing take-up direction which is the clockwise direction in FIG. 4, through a gear train. The contact between the take-up spring 5 and the side plate portion 4 is prevented by a lower plate 66.

The take-up force locking means comprising these elements and the cup member 65 are covered with the cover 70.

Operation will now be described.

The two emergency locking mechanisms and the take-up force locking means operate independently of each other and therefore, these will be described individually. That is, when in an emergency, the emergency locking mechanism works prior to anything.

Figure 7:
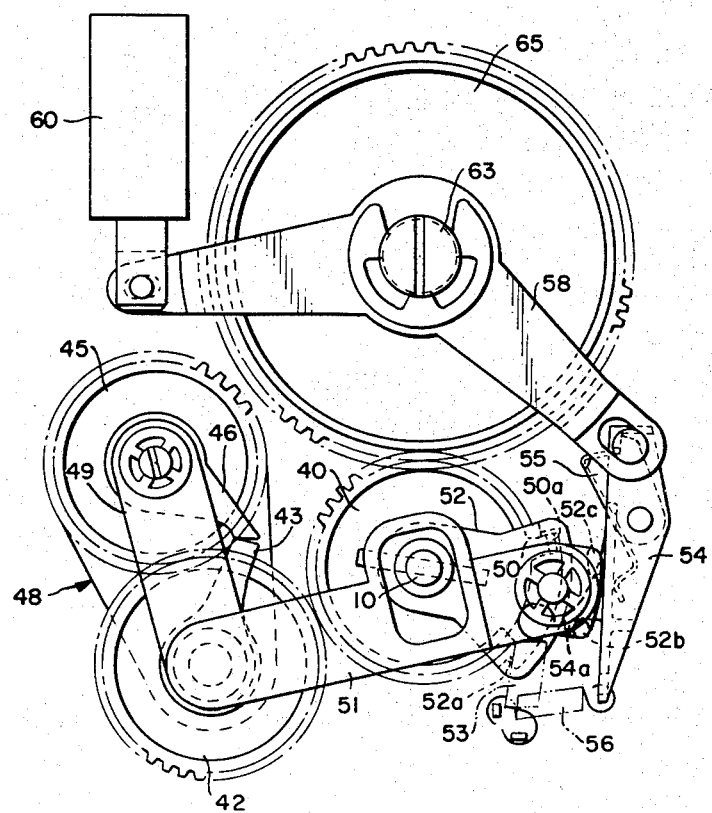
FIGS. 7 to 9 are views similar to FIG. 4 and illustrating the operation of the take-up force locking means.

When a user draws out the webbing W from the retractor against the force of the take-up spring 5, the disc 50 begins to rotate counter-clockwise as viewed in FIG. 7 with the reel shaft means 6, and when the horn portion 50a bears against the upper end edge of the recess 52a of the link arm 52 as viewed in FIG. 7 to rotate the link arm 52 somewhat in counter-clockwise direction, the lower projection 52b of the link arm is engaged with the pawl portion 54a of the trigger member 54, whereby counter-clockwise rotation of the disc 50 is prevented and sliding friction occurs between the disc 50 and the main gear 40 to thereby rotate only the reel shaft means 6 and the main gear 40 (see FIG. 7).

When the buckle is inserted into the tongue, a buckle switch (not shown) is operated and by energization of the solenoid assembly 60, the plunger 61 receives the attraction. However, where the tongue is inserted into the buckle while the webbing is being drawn out, the pawl portion 54a of the trigger member 54 is in engagement with the lower projection 52b of the link arm 52 and therefore, even if the plunger 61 receives the attraction, the trigger member 54 cannot rotate counter-clockwise.

Figure 8:
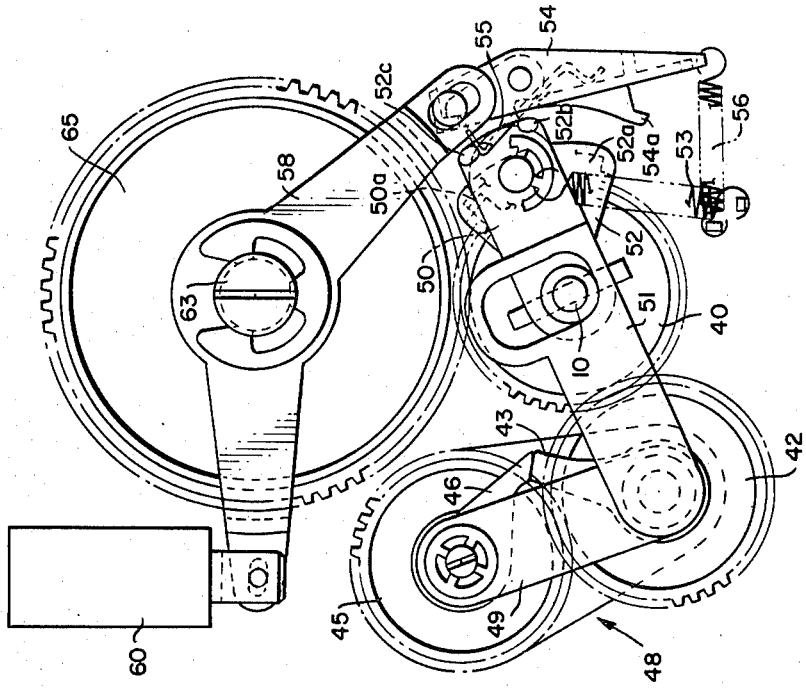
Figure 9:
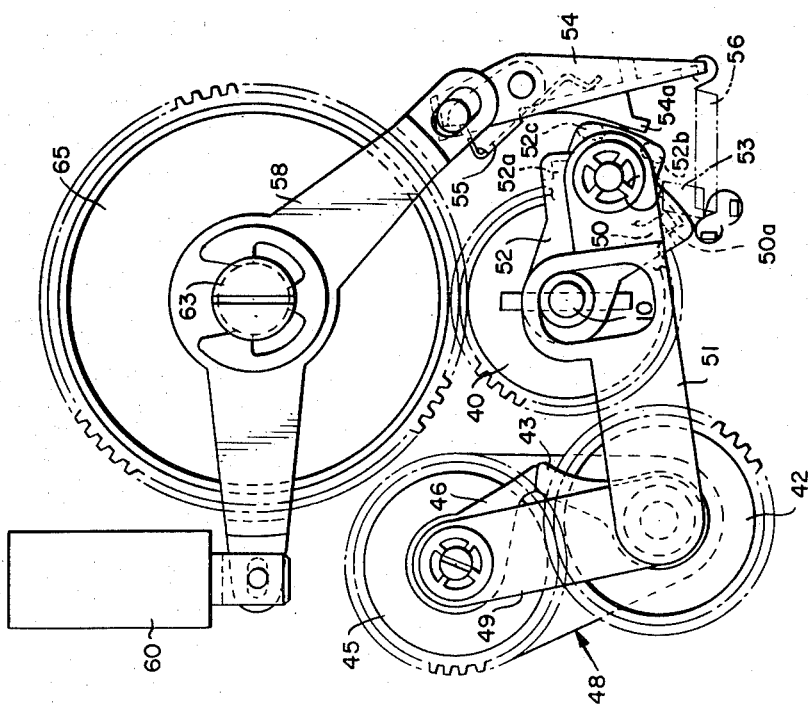

Accordingly, the drawn-out webbing is taken up over its extra amount by the take-up spring 5, whereby the disc 50 is rotated clockwise with the reel shaft means 6, and only after the lever 51 and the link arm 52 are also rotated clockwise by the return spring 53 and the pawl portion 54a of the trigger member 54 is separated from the lower projection 52b of the link arm 52, the trigger member 54 can be rotated counter-clockwisely through the arm 58 by the attraction of the solenoid assembly 60 (see FIG. 8).

Accordingly, by the webbing draw-out effected by the belt wearer after the extra amount has been taken up, the disc 50 is again rotated counter-clockwisely with the reel shaft means 6 through a predetermined center angle determined so as to realize an ideal slack of the belt in the recess 52a of the link arm 52, whereafter the disc 50 is engaged with the lever 51 to rotate this lever and the link arm 52 counter-clockwisely. Since the trigger member 54 has already been rotated counter-clockwisely, the counter-clockwise rotation of the lever 51 and the link arm 52 by the disc 50 is not prevented by the pawl portion 54a, but the lever 51 and the link arm 52 are rotated counter-clockwisely until another projection 52c of the link arm 52 rides on the lever hook spring 55 contained within the trigger member 54 while flexing the lever hook spring 55 and the edge of the slot 51a in the lever 51 bears against the end of the shaft 10 (see FIG. 9). The lever 51 and link arm 52 together form a toggle condition to rotate the shifter 48 counter-clockwisely, thus establishing mesh engagement between the main gear 40 and the idle gear 42 (see FIG. 9).

In this condition, the rotation of the reel shaft means 6 in the webbing take-up direction is restricted by the cams 43 and 46 and therefore, the force of the take-up spring 5 does not act on the webbing. However, the rotation of the reel shaft means in the draw-out direction is permitted until the cams 43 and 46 come to above-described second mutual rotation preventing position. The degree of this draw-out can be adjusted by suitably determining the ratio of the numbers of teeth of the gears 40, 42 and 45. This condition is maintained by the force which the lever-hook spring 55 applies to the projection 52c of the link arm 52.

When the tongue is released from the buckle, a buckle switch is opened to cease the power supply to the solenoid assembly 60 and the trigger member 54 returns to its original position with the aid of the force of the return spring 56 while, at the same time, the toggle link mechanism also returns to its original position with the aid of the return spring 53. Accordingly, the mesh engagement between the main gear 40 and the idle gear 42 is released and the entire amount of webbing W so far drawn out is taken up by the restored force of the take-up spring 5.

Operation of the two emergency locking mechanisms will now be described. The vehicle-sensitive mechanism will first be described. When a deceleration over a predetermined value occurs to the vehicle, the sensing member 21 tilts due to its inertia to tilt the lever 20 and thereby raise the ratchet lever 17. Thereupon, the seat occupant receives the forwardly leaning force and the webbing is rapidly drawn out, so that the ratchet gear 12 is rotated clockwisely as viewed in FIG. 2, thus further raising the ratchet lever 17 meshing with the ratchet gear 12 at the ratchet tooth 17a. Accordingly, the lock member 13 comes into mesh engagement with the latch plates 8, 9 and the reel shaft means 6 is locked. Thus, there is established the emergency locking by the vehicle-sensitive emergency locking mechanism.

As regards the webbing-sensitive mechanism, under the normal condition, namely, under the condition in which the seat occupant moves normally, the disc 25, inertia member 23 and holding plate 26 rotate with the reel shaft means 6. However, when the speed of the vehicle abruptly changes due to collision or the like, the seat occupant receives a strong forwardly leaning force, whereby the webbing W is abruptly drawn out. When the rotational angle acceleration of the reel shaft means 6 caused by such draw-out of the webbing W exceeds a predetermined value, the inertia member 23 rotates counter-clockwisely about the boss 22, as viewed in FIG. 3, due to the inertia against the force of the coil spring 27 and accordingly, the tooth 23a comes into engagement with one of the ratchet teeth of the cylinder portion 29 of the cup member 28. As a result, the cup member 28 receives a clockwise rotational force, and through the lug 31 and lever 32, the lock member 13 is brought into mesh engagement with the latch plates 8, 9. Thus, the rotation of the reel shaft means 6 is locked to prevent draw-out of the webbing W.

The purport of the present invention lies in disposing the take-up spring 5 at the above-described position to thereby enable the provision of the take-up force locking means and the two emergency locking mechanisms and therefore, the above-described constructions of the take-up force locking means and of the two emergency locking mechanisms are only illustrative and of course, those having any other construction may also be used.

Thus, according to the present invention, there is realized a dual type tension lock retractor which is increased in safety and comfort with which it is used.

What is claimed is:

1. A retractor comprising a base member having two opposed side plate portions, reel shaft means rotatably supported between said two opposed side plate portions of said base member, a first gear member fixed to one end of said reel shaft means, a second gear member rotatably supported about a shaft on said side plate portion which is adjacent to said one end of said reel shaft means, said second gear member being meshed with said first gear member and given a webbing take-up force, take-up force locking means for relieving the webbing take-up force applied to webbing during the wearing of a belt, said take-up force locking means being mounted on said side plate portion which is adjacent to said one end of said reel shaft means, sensing means for sensing the wearing of the belt by a user, said sensing means being mounted on the same side plate portion as the take-up force locking means, an arm member rotatably supported about said shaft of said second gear member and having a first arm portion with a free end connected to said sensing means and a second arm portion with a free end connected to said take-up force locking means, said sensing means being adapted to operate said take-up force locking means through said arm member, a webbing-sensitive emergency locking mechanism for locking the rotation of said reel shaft means in webbing draw-out direction when the webbing is drawn out at a rate exceeding a predetermined rate, said webbing-sensitive emergency locking mechanism being mounted on said side plate portion which is adjacent to the other end of said reel shaft means, and a vehicle-sensitive emergency locking mechanism for locking the rotation of said reel shaft means in webbing draw-out direction when a deceleration over a predetermined value occurs to the vehicle, said vehicle-sensitive emergency locking mechanism being mounted on the inner surface of said side plate portion which is adjacent to said the other end of said reel shaft means.

2. A retractor as recited in claim 1, wherein said take-up force locking means includes said first gear member.

3. A retractor as recited in claim 1, wherein said second gear member is a cylindrical cup member in which a take-up spring is contained for providing a webbing take-up force to said second gear member and on the periphery of which gear teeth are formed.

* * * * *